United States Patent Office 2,741,542
Patented Apr. 10, 1956

2,741,542

PROCESS FOR PREPARING PHOSPHORUS OXYCHLORIDE

George E. Taylor, St. Louis, Mo., assignor to Monsanto Chemical Company, St. Louis, Mo., a corporation of Delaware No Drawing. Application June 4, 1952,
Serial No. 291,810

13 Claims. (Cl. 23—203)

This invention relates to the preparation of phosphorus oxychloride and more specifically pertains to the oxidation of phosphorus trichloride to phosphorus oxychloride with oxygen and at elevated pressures.

Phosphorus oxychloride has been prepared by the oxidation of phosphorus trichloride according to numerous oxidation processes. For example, it has been proposed to oxidize phosphorus trichloride with ozone and potassium chlorate but employing these oxidizing agents presents inconvenient operating conditions since all moisture must be excluded from the reagents and reaction vessels. It has also been proposed to oxidize phosphorus trichloride to phosphorus oxychloride with oxygen in the presence of a manganese compound, preferably an oxide of manganese, as a catalyst. This process is carried out by forming a solution of potassium permanganate in the acetone, adding this solution to phosphorus trichloride, introducing oxygen into the resulting mixture and then distilling off the phosphorus oxychloride. This process has the disadvantage in that the desired product must be distilled to obtain it free from other reaction products.

Numerous attempts have been made to oxidize phosphorus trichloride with oxygen in the absence of oxidation catalysts in order to obtain pure phosphorus oxychloride. One of the most recently reported oxidations without a catalyst appears in a B. I. O. S. Final Report No. 562, Item No. 22, "The German Phosphorus Industry at Bitterfeld and Piesteritz," 1946. Briefly, this process comprises adding oxygen below the surface of liquid phosphorus trichloride while stirring the liquid reaction vigorously, maintaining a pressure of two atmospheres in the reaction vessels by constantly supply oxygen to the reaction vessels and by maintaining a reaction temperature from 50° to 60° C. According to this process, substantially pure phosphorus oxychloride is obtained only after a reaction period of from 60 to 80 hours.

It has now been discovered that substantially pure phosphorus oxychloride; that is, phosphorus oxychloride having a set point of 0.8° to 1.0° C., can be readily obtained by the oxidation of phosphorus trichloride with oxygen in the presence of one of the ortho acids of phosphorus; that is, in the presence of orthophosphorus acid or orthophosphoric acid, at elevated pressures in but a few hours. Preferably, this novel reaction between phosphorus trichloride and oxygen in the presence of minute catalytic proportions of orthophosphorus acid or orthophosphoric acid is carried out at elevated pressures of from 2 to 25 pounds per square inch or higher and at temperatures of from 0° C. to 100° C. or higher. This process may be carried out as a batch preparation or may be carried out in a simple continuous process.

The orthophosphorus acid can be added per se to the reaction medium or may be introduced into the reaction by the addition of minute quantities of water to the phosphorus trichloride. If orthophosphorus acid is added to the reaction medium by the addition of water to the phosphorus trichloride, the formation of orthophosphorus acid with the simultaneous formation of hydrogen chloride takes place according to the following reaction:

$$3H_2O + PCl_3 \rightarrow H_3PO_3 + 3HCl$$

It is not essential that the HCl be removed from the phosphorus trichloride mixture but, since it is not appreciably soluble in the phosphorus trichloride, substantially all of it may be readily removed. For example, the desired quantity of water is added to the phosphorus trichloride and when the hydrogen chloride ceases coming off, the resulting mixture, which is then substantially free from HCl is added to the reactor. Of course, the water can be introduced into the phosphorus trichloride after the phosphorus trichloride has been added to the reaction vessel by humidifying the oxygen employed in the reaction.

The proportions of the ortho acids of phosphorus which are useful as catalysts for this oxidation process can vary substantially but preferably are within the range of 0.015% to 0.4% by weight of phosphorus trichloride employed in the reaction. This is within the range of the quantity of orthophosphorus acid produced by the addition of 0.01% to 0.2% by weight of water into the phosphorus trichloride.

Since one of the reactants is a liquid and the other is a gas, it is desirable to carry out the reaction under elevated pressures to maintain good contact between reactants. Contact between the reactants may also be increased by adding the oxygen below the surface of the liquid reactant and agitating the liquid reactant to disperse the oxygen throughout the liquid mass. It will be appreciated, of course, that as the reaction temperature is increased, the solubility of oxygen in phosphorus trichloride decreases, so with an increase in temperature, it is desirable to increase the degree of agitation. For example, if the reaction temperature is maintained at about 0° to 5° C., the amount of agitation to provide good contact between the reactants can be achieved by shaking phosphorus trichloride in the presence of oxygen. However, where the reaction temperature is to be maintained at a temperature of from 50° to 70° C. or higher, the oxygen may be introduced below the surface of the liquid and thoroughly incorporated into the liquid, as by extremely turbulent agitation, or the phosphorus trichloride can be sprayed into the oxygen atmosphere in the reactor.

The process of this invention can be carried at pressures varying from 2 to 25 pounds per square inch or higher. It has been found that optimum results are obtained while the pressure is maintained at a pressure of about 10 pounds per square inch and above. It is desirable that the pressure be maintained substantially only by the use of oxygen, for as will hereinafter be illustrated, the use of a combination of oxygen and nitrogen to maintain the desired reaction pressure greatly retards the reaction due to the presence of nitrogen.

The following specific examples are intended to illustrate the process of this invention and are not intended as limitations thereon.

EXAMPLE I

A glass reactor was evacuated to an absolute pressure of about 5 mm. Hg. Oxygen was then drawn into the reactor and the reactor again evacuated to about 5 mm. Hg. There was added to this reactor, 190 parts by weight of phosphorus trichloride containing a minute quantity of phosphorus acid equivalent to the amount of phosphorus acid resulting from the reaction of 0.1% by weight of water based on the phosphorus trichloride. Then oxygen was introduced into the reactor above the phosphorus trichloride mixture until a pressure of 10 pounds per square inch was obtained. The reaction vessel was shaken for a period of 70 minutes during which time the reaction medium was cooled periodically with crushed Dry Ice. The pressure during the reaction was maintained at 10 pounds per square inch by a regulator valve on the oxygen supply. At the end of this 70 minute period, it was noted that oxygen was no longer going into the reaction vessel. It was also observed that the resulting mixture was a slush of crystals in liquid. After warming this slush to about room temperature, the resulting liquid was discharged into a receiving vessel. A portion of this liquid was cooled to determine its set point. The set point of this product was 0.8° C., indicating that the phosphorus oxychloride produced was of satisfactory purity. In this manner, there was obtained 212 parts by weight of phosphorus oxychloride, a 100% yield.

The following example illustrates the process of this invention where orthophosphoric acid ($H_3PO_4$) is employed as the catalyst. This example also illustrates the adaptability of the process of this invention to a continuous process.

EXAMPLE II

Three pressure reactors A, B and C each of ten gallon capacity and each having a pump attached to the discharge line from the reactor are connected in series so that the discharge from A can be recycled into reactor A and a portion of the discharge effluent from A can be pumped into the feed line of reactor B and the discharge from B can be recycled to the feed line reactor B and a portion of the discharge effluent can be pumped into the feed line of reactor C. The feed line of each reactor is connected to a spray head in the reactor so that the liquid feed can be introduced into the atmosphere of the reactor as a spray of droplets. Each of the three reactors are connected to an oxygen supply line in which there is an adjustable regulator valve which can maintain a supply of oxygen in the reactors at a constant predetermined pressure.

A phosphorus trichloride feed supply is prepared by mixing .05% by weight of 85% orthophosphoric acid with the trichloride. The reactors are evacuated to an absolute pressure of about 5 in. Hg, oxygen is drawn into the reactors, the reactors are evacuated again to about 5 in. Hg, and then oxygen is charged into the three reactors until a pressure of about 20 pounds per square inch gauge is obtained. Thereafter about four gallons of the phosphorus trichloride feed containing orthophosphoric acid is pumped into reactor A. The feed line is closed and the pump in the discharge line is started with the feed outlet to reactor B shut off. The phosphorus trichloride reaction mixture is recycled into reactor A. Oxidation takes place substantially as soon as the phosphorus trichloride mixture is pumped into the reactor, and the temperature in the reactor rapidly increases to about 75° to 80° C. Periodically samples of the discharge effluent from A are taken to determine the extent of oxidation. When this effluent from reactor A assayed 60% conversion to phosphorus oxychloride, the effluent feed to reactor B from the pump in the discharge line of reactor A is adjusted to the rate of about 4 gallons per hour and the remainder of the effluent from A is recycled. The feed line to reactor A is opened and the pump from the phosphorus trichloride feed supply is also adjusted to four gallons per hour.

The pump in the discharge line of reactor B is started and 100% of the discharge effluent from this reactor is recycled. Periodically samples of the discharge effluent from B are taken to determine the extent of oxidation in this reactor. When the discharge effluent from reactor B assays 94% phosphorus oxychloride, the effluent feed from the pump in the discharge line of reactor B is adjusted to feed this effluent at the rate of four gallons per hour into reactor C and the remainder of the effluent is recycled to the feed line of reactor B.

The pump in the discharge line of reactor C is started and 100% of the discharge effluent is recycled until the effluent assays 100% conversion to phosphorus oxychloride as indicated by a crystallization point of about 0.8° C. to 1.0° C. At this time the phosphorus oxychloride is withdrawn to storage from the pump in the discharge line of reactor C at the rate of about four gallons per hour and the remainder of the effluent is recycled to the feed line of reactor C. The entire system is now at equilibrium and as long as the phosphorus trichloride feed from the supply mixture containing orthophosphoric acid is pumped into reactor A, the phosphorus oxychloride product can be withdrawn at the same rate from reactor C.

By this process, phosphorus oxychloride having a crystallization point of 0.8° C. has been obtained. This crystallization point corresponds to that of technical phosphorus oxychloride and is substantially pure.

The process of this invention when carried out continuously is not at all limited to the rates disclosed in the above example. For when larger reactors are employed, the product can, of course, be produced at a much higher rate.

In the following example, there is described the oxidation of phosphorus trichloride with oxygen in the absence of any catalytic material for the purpose of comparing the closest prior art process with the process of this invention. There is also described a reaction between the same reactants in the same proportions under identical reaction conditions except that a minute quantity of phosphorus acid is employed as a catalyst.

EXAMPLE III

Two preparations, "A" and "B," were carried out, each at a pressure of 10 pounds per square inch maintained by oxygen alone. In each case, the heat of the reaction was removed by the use of crushed Dry Ice as before. In this manner, the reaction temperature was in the range of from 0° C. to 5° C. In reaction "A" phosphorus trichloride was the only material added to the reactor. In reaction "B" before charging to the reactor, there was added 0.05% by weight of water to the phosphorus trichloride thereby forming 0.075% by weight phosphorus acid in the phosphorus trichloride. This mixture was charged to the reactor after effervescence of HCl had ceased and thereafter oxygen was added. The pertinent data and the results of these preparations are tabulated below:

Table

OXIDATION OF PHOSPHORUS TRICHLORIDE

| Preparation | Phosphorus Trichloride, parts | Oxygen Pressure, p. s. i. | Reaction Temperature, ° C. | Reaction Time, minutes | Percent Conversion | Set Point, ° C. |
|---|---|---|---|---|---|---|
| "A" | 190 | 10 | 0 to 5 | 112 | 52 | -------- |
|  |  |  |  | 200 | 60 | -------- |
| "B" | 190 | 10 | 0 to 5 | 112 | 100 | 0.9 |

Although preparation "A" progressed to 60% conversion in 200 minutes, the plot of per cent conversion against time of reaction showed that the reaction had slowed considerably and was following a slowly increasing straight line from 60 to 200 minutes of reaction. This curve when extrapolated to 100% conversion indicated a reaction time in excess of 10 hours. Thus preparation "A" follows the course of the reaction described in the prior art. However, the presence of such a minute quantity of phosphorus acid as 0.075% by weight achieved a 100% conversion in 112 minutes.

EXAMPLE IV

The process of Example I was repeated except that the reaction pressure was maintained at 5 pounds per square inch of oxygen and the phosphorus acid content was that resulting from the reaction of 0.05% by weight of water based on the phosphorus trichloride. After 185 minutes, the oxidation was 97% complete and the reaction would have required another 40 to 60 minutes to go to 100% completion.

EXAMPLE V

The process of Example IV was repeated except that oxygen was introduced into the reaction medium until the pressure was 3 pounds per square inch. Then nitrogen was added until the resulting pressure was 15 pounds per square inch. The reactants were again shaken together. Cooling was accomplished by means of crushed Dry Ice and only oxygen was added to the reactor by means of a preset regulating valve. In this case, the reaction proceeded quite slowly as indicated by intermittent weighing of the reaction vessel to determine the weight gained during reaction. According to the curve obtained by these gains in weight during reaction, it was determined that the reaction would require 80 or more hours to go to 100% completion, however, the reaction was stopped before going to this degree of completion.

It is quite evident from the results of this preparation that the presence of nitrogen greatly suppresses the oxidation reaction. It is, therefore, desirable that nitrogen or air be removed and excluded from the reaction vessel.

The quality of the ortho acid of phosphorus to be employed as a catalyst in the process of this invention can be substantially varied, for example, the quantity of orthophosphorus acid that can be used corresponds to that quantity produced by the reaction of from about 0.01% to about 0.2% by weight of water based on the phosphorus trichloride which is to be oxidized. Also, the same proportions of orthophosphorus acid may be formed in situ by the addition of humidified oxygen. This corresponds to about 0.015% to about 0.3% by weight of orthophosphorus acid based on the phosphorus trichloride. Likewise the quantity of orthophosphoric acid can vary from about 0.015% to about 0.4% by weight.

The process of this invention can be carried out in standard reaction equipment which is designed to be operated at the pressures employed in the process of this invention. However, the presence of vulcanized rubber, iron, copper, and other similar materials which are known to the art to poison or inhibit the oxidation of phosphorus trichloride should be avoided.

This invention has been illustrated by means of specific reactions involving the use of specific reaction conditions and specific quantities of reactants, but it is not desired or intended to limit the reaction solely thereto for as hitherto stated, the precise proportions of the reactants and catalyst may be varied and the manner in which the catalyst in introduced may be varied, as desired, without departing from the spirit and scope of the invention as defined in the appended claims.

What is claimed is:

1. The process for preparing phosphorus oxychloride which comprises reacting phosphorus trichloride with oxygen in the presence of at least 0.015% by weight of an ortho acid of phosphorus at a temperature of at least 0° C. and at a pressure of at least 2 pounds per square inch.

2. The process for preparing phosphorus oxychloride which comprises reacting phosphorus trichloride with oxygen at a pressure of from 2 to 25 pounds per square inch and in the presence of at least 0.015% by weight of an ortho acid of phosphorus and at a temperature of at least 0° C.

3. The process for preparing phosphorus oxychloride which comprises reacting phosphorus trichloride with oxygen at a pressure above 2 pounds per square inch and at a temperature of at least 0° C. and in the presence of at least 0.15% by weight of an ortho acid of phosphorus.

4. The process of claim 3 where the ortho acid of phosphorus is orthophosphorus acid.

5. The process of claim 3 where the ortho acid of phosphorus is orthophosphoric acid.

6. The process for preparing phosphorus oxychloride which comprises reacting phosphorus trichloride with oxygen at a pressure above about 10 pounds per square inch and at a temperature of from 0° C. to 100° C. and in the presence of about 0.015% to 0.3% by weight of orthophosphorus acid based on the phosphorus trichloride.

7. The process for preparing phosphorus oxychloride which comprises reacting phosphorus trichloride with oxygen at a pressure above about 10 pounds per square inch and at a temperature of from 0° C. to 100° C. and in the presence of about 0.05% by weight of orthophosphoric acid based on the phosphorus trichloride.

8. The process for preparing phosphorus oxychloride which comprises adding from about 0.01% to about 0.2% by weight of water to phosphorus trichloride, reacting this mixture with oxygen at a pressure above about 10 pounds per square inch and at a temperature of from 0° C. to 100° C. whereby phosphorus oxychloride is formed, and recovering said oxychloride.

9. The process for preparing phosphorus oxychloride which comprises adding from about 0.015% to 0.3% by weight of orthophosphorus acid to phosphorus trichloride, reacting this mixture with oxygen at a pressure above about 10 pounds per square inch and at a temperature of from 0° C. to 100° C. whereby phosphorus oxychloride is formed, and recovering said oxychloride.

10. The process for preparing phosphorus oxychloride which comprises adding from about 0.015% to 0.4% by weight of orthophosphoric acid to phosphorus trichloride, reacting this mixture with oxygen at a pressure above about 10 pounds per square inch and at a temperature of from 0° C. to 100° C. whereby phosphorus oxychloride is formed, and recovering said oxychloride.

11. In the preparation of phosphorus oxychloride by the oxidation of phosphorus trichloride, the steps which comprise adding to the phosphorus trichloride from about 0.01% to 0.2% by weight of water and reacting this mixture with oxygen at a pressure above about 10 pounds per square inch and at a temperature of from 0° C. to 100° C.

12. In the preparation of phosphorus oxychloride by the oxidation of phosphorus trichloride, the steps which comprise adding to the phosphorus trichloride from 0.015% to about 0.3% by weight of orthophosphorus acid and reacting this mixture with oxygen at a pressure above about 10 pounds per square inch and at a temperature of from 0° C. to 100° C.

13. In the preparation of phosphorus oxychloride by the oxidation of phosphorus trichloride, the steps which comprise adding to the phosphorus trichloride from 0.015% to about 0.4% by weight of orthophosphoric acid and reacting this mixture with oxygen at a pressure above about 10 pounds per square inch and at a temperature of from 0° C. to 100° C.

References Cited in the file of this patent

UNITED STATES PATENTS

| | | |
|---|---|---|
| 2,002,277 | Roberts | May 21, 1935 |

FOREIGN PATENTS

| | | |
|---|---|---|
| 624,884 | Germany | Jan. 30, 1936 |
| 465,526 | Great Britain | May 10, 1937 |

OTHER REFERENCES

Mellor: "Comprehensive Treatise on Inorganic and Theoretical Chemistry" (1928), vol. 2, page 91, and vol. 8, page 1019; Longmans, Green and Co., New York.